L. C. ACCOLA.
TRAP.
APPLICATION FILED MAY 6, 1910.

987,530.

Patented Mar. 21, 1911.

2 SHEETS—SHEET 1.

WITNESSES:
F. J. Hackenberg.
P. A. Hoster

INVENTOR
Lorenz C. Accola

BY
ATTORNEYS

THE NORRIS PETERS CO., WASHINGTON, D. C.

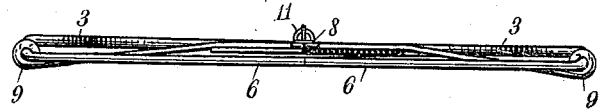
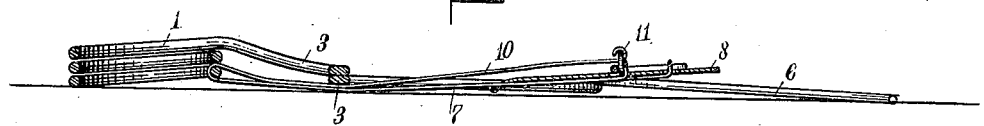
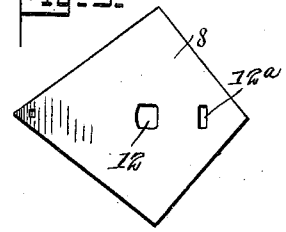
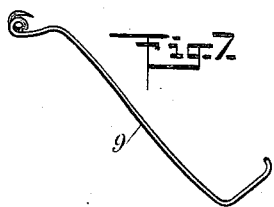

UNITED STATES PATENT OFFICE.

LORENZ CONRAD ACCOLA, OF LA GRANGE, MISSOURI.

TRAP.

987,530. Specification of Letters Patent. Patented Mar. 21, 1911.

Application filed May 6, 1910. Serial No. 559,735.

*To all whom it may concern:*

Be it known that I, LORENZ C. ACCOLA, a citizen of the United States, and a resident of La Grange, in the county of Lewis and State of Missouri, have invented a new and Improved Trap, of which the following is a full, clear, and exact description.

The invention relates to traps, more particularly to mechanical traps for catching animals and the like, and has for an object to provide a simple, quick-operating mechanical trap for trapping animals, particularly quadrupeds. For the purpose mentioned, use is made of a coiled wire spring having ends extended from the spring and crossed, one over the other, a trigger wire mounted on the spring and engaging a trigger, and guide wires engaging the trigger and the crossed ends at the point of crossing.

Reference is to be had to the accompanying drawings forming a part of this specification, in which similar characters of reference indicate corresponding parts in all the views.

Figure 1:
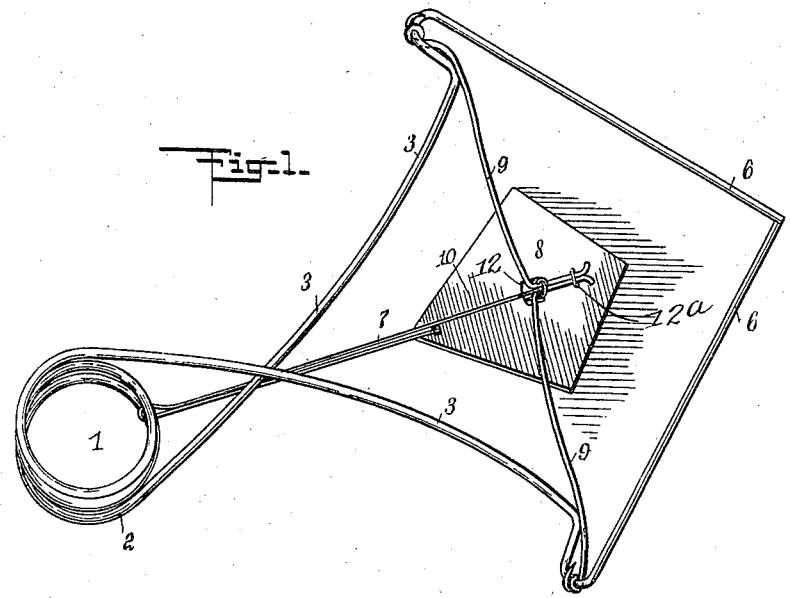
Figure 2:
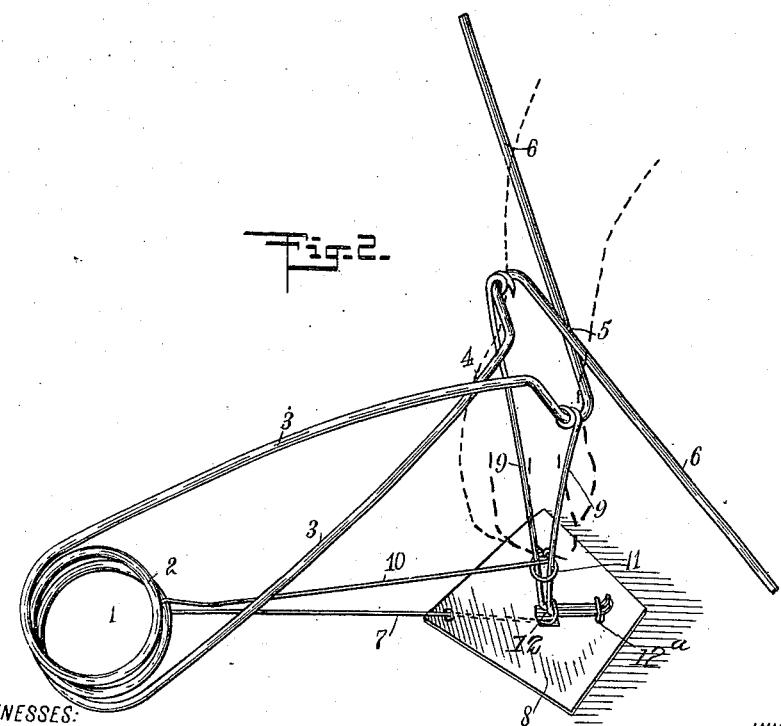

Figure 1 is a perspective view of my device showing the same set; Fig. 2 is a perspective view of my trap showing the same partially sprung; Fig. 3 is a front elevation of the trap when it is set; Fig. 4 is a side elevation of the trap when it is set; Fig. 5 is a plan view of the trigger of my trap; Fig. 6 is a perspective view of the trigger wire, forming a part of my trap; and Fig. 7 is a perspective view of one of the guide wires of my device.

Referring more particularly to the various views, I provide a spring 1, comprising a coiled wire 2 of some springy material. The ends 3 of the wire 2 extend from the wire and are crossed one over the other, at the points 4 and 5, the extreme ends 6 of the wire being extended away from each other when the trap is in normal position. A trigger wire 7 is pivotally mounted on the spring 1 and engages a trigger 8. Intermediate the points of crossing, 4 and 5, are guide wires 9 pivotally engaging the ends 3, 3, and secured to the trigger 8. The lower arm 10 of the trigger wire 7 is provided with loops 11$^a$ and 11$^b$, the loop 11$^b$ being adapted to be inserted in a hole 12 in the trigger plate 8, and the loop 11$^a$ being adapted to be inserted in a hole 12$^a$ in the trigger plate 8. To secure the guide wires 9 to the plate 8, the ends of the wires 9 are passed through the loops 11$^a$ and 11$^b$ so that the wires are hingedly mounted on the plate, thus securing the trigger wire 7 and the wires 9 to the trigger 8 as will be seen in Fig. 2. For the purpose of enabling the arm 10 to slide easily on the guide wires 9, a metal ring 11 can be preferably passed over the wires 9 and secured to the arm 10 so that the said ring will slide on the guide wires 9 and move downwardly on the same when the guide wires are pressed outwardly.

Now when the trap is to be set, as shown in Fig. 1, the guide wires 9 are moved apart at the point where they engage the ends 3, 3, by spreading the ends 3, 3 outward, so that the terminals of the extreme ends 6 come toward each other. As the guide wires 9 are spread out, the trigger 8 moves to a position intermediate the ends 3, 3, and by pressing the trigger 8 to a position slightly beyond the horizontal plane of the ends 3, the guide wires 9, 9 will engage the upper side of the ends 3 and hold the trap in open position, as may be conveniently seen in Fig. 1. When a slight pressure is exerted on the trigger 8 the trap will close, as can be seen in Fig. 2, and the pressure having been applied presumably by an animal stepping on the trigger, it will be easily understood that the animal will be securely held in the trap as the same snaps to its normal position.

By providing the arm 10 on the trap the same is greatly strengthened, quicker action is assured, and a means is provided for holding the trap from coming open after the animal is caught. However, it will be understood that my trap is accurately operative without the arm 10, and it will be further understood that although I have shown a particular construction for the purpose of describing my device, the scope of my invention is disclosed in the appended claims.

Having thus described my invention, I claim as new and desire to secure by Letters Patent:

1. A trap, comprising a piece of wire adapted to constitute a spring and having projecting ends bent to extend in opposite directions, wires pivotally engaging the ends, a trigger secured to the wires, and a trigger wire engaging the trigger and having an end secured to the spring.

2. A trap, comprising a wire spring, having its ends extended from the spring and crossed one over the other, guide wires pivotally secured to the ends adjacent to the point of crossing, a trigger, and a trigger wire secured to the trigger and pivotally engaging the spring, and the said guide wires pivotally engaging the trigger wire.

3. A trap, comprising a coiled wire spring having its ends extended from the spring and crossed one over the other, a trigger wire mounted on the spring, a trigger secured to the trigger wire and adapted to be moved intermediate the ends of the spring when the same are spread apart, and guide wires pivotally engaging the trigger wire and the ends adjacent the point of crossing.

4. A trap, comprising a coiled wire spring having its ends crossed, a trigger wire pivotally engaging the spring, a trigger mounted on the trigger wire, guide wires pivotally mounted on the said ends and secured to the trigger, and an arm integral with the trigger wire and slidably engaging the guide wires.

In testimony whereof I have signed my name to this specification in the presence of two subscribing witnesses.

LORENZ CONRAD ACCOLA.

Witnesses:
 THEODORE A. DAY,
 JOSEPH V. KLUSMEIER.

---

Copies of this patent may be obtained for five cents each, by addressing the "Commissioner of Patents, Washington, D. C."